US010135725B2

(12) United States Patent
Qi et al.

(10) Patent No.: US 10,135,725 B2
(45) Date of Patent: Nov. 20, 2018

(54) DATA PACKET FORWARDING METHOD, APPARATUS, AND SYSTEM

(71) Applicant: Huawei Technologies Co., Ltd., Shenzhen (CN)

(72) Inventors: Kai Qi, Hangzhou (CN); Bailin Wen, Hangzhou (CN); Fengwei Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 15/240,232

(22) Filed: Aug. 18, 2016

(65) Prior Publication Data

US 2016/0359736 A1    Dec. 8, 2016

Related U.S. Application Data

(63) Continuation of application No. PCT/CN2014/092543, filed on Nov. 28, 2014.

(30) Foreign Application Priority Data

Feb. 19, 2014 (CN) .......................... 2014 1 0055766

(51) Int. Cl.
*H04L 12/741* (2013.01)
*H04L 12/703* (2013.01)
(Continued)

(52) U.S. Cl.
CPC ............ *H04L 45/54* (2013.01); *H04L 43/026* (2013.01); *H04L 45/28* (2013.01); *H04L 45/64* (2013.01); *H04L 49/70* (2013.01)

(58) Field of Classification Search
CPC ........... H04B 17/00; H04B 3/46; H04L 43/00; H04L 43/50; H04L 43/0876;
(Continued)

(56) References Cited

U.S. PATENT DOCUMENTS

2013/0100951 A1    4/2013 Ishizuka
2015/0372902 A1*   12/2015 Giorgetti ................. H04L 45/64
                                                    370/219

FOREIGN PATENT DOCUMENTS

CN    102946365 A    2/2013
CN    103119900 A    5/2013
(Continued)

OTHER PUBLICATIONS

Machine Translation and Abstract of Chinese Publication No. CN102946365, Feb. 27, 2013, 9 pages.
(Continued)

*Primary Examiner* — Dady Chery
(74) *Attorney, Agent, or Firm* — Conley Rose, P.C.

(57) ABSTRACT

A data packet forwarding solution, which relates to the field of network transmission. A virtual switch in the solution saves a flow entry as an aging flow entry deleted from a flow table in a switch, and receives a reporting data packet generated according to a forwarding data packet when the forwarding data packet fails to match each flow entry in the flow table in the switch and a secure channel between the switch and the controller is faulty, delivers an aging flow entry matching the reporting data packet from an aging flow table to the switch, where the aging flow table includes one or more flow entries that are deleted as aging flow entries from a flow table in the switch.

20 Claims, 8 Drawing Sheets

(51) Int. Cl.
*H04L 12/26* (2006.01)
*H04L 12/715* (2013.01)
*H04L 12/931* (2013.01)

(58) Field of Classification Search
CPC ............. H04L 43/0882; H04L 43/0888; H04L 43/0894; H04L 41/04; H04L 41/085; H04L 41/12; H04L 45/02; H04W 24/00; H04W 84/18
See application file for complete search history.

(56) References Cited

FOREIGN PATENT DOCUMENTS

| | | |
|---|---|---|
| CN | 103401784 A | 11/2013 |
| CN | 103401794 A | 11/2013 |
| WO | 2011162215 A1 | 12/2011 |

OTHER PUBLICATIONS

Foreign Communication From a Counterpart Application, Chinese Application No. 201410055766.X, Chinese Office Action dated Aug. 9, 2017, 5 pages.
"OpenFlow Switch Errata," Version 1.0.2, ONF TS-013, Nov. 1, 2013, 12 pages.
Foreign Communication From a Counterpart Application, PCT Application No. PCT/CN2014/092543, English Translation of International Search Report dated Mar. 6, 2015, 2 pages.
Foreign Communication From a Counterpart Application, PCT Application No. PCT/CN2014/092543, English Translation of International Search Report dated Mar. 6, 2015, 6 pages.

\* cited by examiner

DATA PACKET FORWARDING METHOD, APPARATUS, AND SYSTEM

CROSS-REFERENCE TO RELATED APPLICATION

This application is a continuation of International Application No. PCT/CN2014/092543, filed on Nov. 28, 2014, which claims priority to Chinese Patent Application No. 201410055766.X, filed on Feb. 19, 2014, both of which are hereby incorporated by reference in their entireties.

TECHNICAL FIELD

The present disclosure relates to the field of network transmission, and in particular, to a data packet forwarding method, apparatus, and system.

BACKGROUND

An OPENFLOW network includes an OPENFLOW switch, an OPENFLOW controller, and a virtual switch FlowVisor. The OPENFLOW switch performs forwarding at a data layer, the virtual switch virtualizes the OPENFLOW network, and the OPENFLOW controller performs centralized control on the OPENFLOW network. The OPENFLOW switch and the corresponding OPENFLOW controller perform message exchange through a secure channel and the virtual switch can intercept a message on the secure channel.

A specific process of performing data packet forwarding on the OPENFLOW network is as follows. The OPENFLOW switch searches for a flow entry in a stored multi-flow table when the OPENFLOW switch receives a data packet, the OPENFLOW switch forwards the data packet according to the flow entry when the data packet can match one flow entry in the table, the OPENFLOW switch creates a reporting data packet PacketIn and reports the PacketIn to the corresponding OPENFLOW controller through the secure channel when the data packet cannot match any flow entry. The OPENFLOW controller determines a forwarding action of the data packet according to the PacketIn, and delivers a new flow entry to the OPENFLOW switch using the FlowVisor. The OPENFLOW switch forwards the data packet according to the flow entry delivered by the OPENFLOW controller. The virtual switch FlowVisor, as a proxy OPENFLOW controller, may also perform segmentation on a network, that is, the virtual switch performs segmentation on the OPENFLOW switch and the OPENFLOW controller according to a configuration policy, and performs interception, modification, and forwarding operations on an OPENFLOW message according to a built-in policy. The OPENFLOW controller is allowed to control only a flow within a policy scope of the OPENFLOW controller.

In an actual application, an aging mechanism is further configured on an OPENFLOW network, that is, in an OPENFLOW switch, to save flow entry resources, the OPENFLOW switch deletes a flow entry when the flow entry is not hit by a data packet within a long time.

The prior art has at least the following problem. A secure channel is the only channel between an OPENFLOW controller and an OPENFLOW switch. When the OPENFLOW switch deletes some flow entries according to an aging mechanism, and when the secure channel between the OPENFLOW controller and the corresponding OPENFLOW switch is faulty, subsequently received data packets corresponding to these flow entries cannot be forwarded, and consequently, the OPENFLOW switch loses a data exchange function.

SUMMARY

Embodiments of the present disclosure provide a data packet forwarding method, apparatus, and system to resolve the following problem in the prior art that is when a secure channel between an OPENFLOW controller and a corresponding OPENFLOW switch is faulty, and when the OPENFLOW switch deletes some flow entries according to an aging mechanism, subsequently received data packets corresponding to these flow entries cannot be forwarded, and consequently, the OPENFLOW switch loses a data exchange function. The technical solutions are as follows.

According to a first aspect, a data packet forwarding method is provided, applied to a virtual switch in a network that includes an OPENFLOW switch, an OPENFLOW controller, and the virtual switch, where the method includes saving, in an aging flow table, a received aging flow entry that is deleted by the OPENFLOW switch and reported by the OPENFLOW switch when a secure channel between the OPENFLOW switch and the OPENFLOW controller is faulty, where the aging flow table is used to store an aging flow entry that is deleted, by the OPENFLOW switch after the secure channel is faulty, determining whether a received reporting data packet sent by the OPENFLOW switch matches an aging flow entry in the aging flow table, where the reporting data packet is generated by the OPENFLOW switch according to a forwarding data packet when the forwarding data packet is received and after the forwarding data packet fails to match a stored forwarding flow entry, and delivering the matched aging flow entry to the OPENFLOW switch such that the OPENFLOW switch forwards the forwarding data packet according to the matched aging flow entry when the reporting data packet matches one aging flow entry in the aging flow table.

In a first possible implementation manner of the first aspect, the method further includes reporting, to the OPENFLOW controller, aging flow entries in the aging flow table that are already delivered to the OPENFLOW switch such that the OPENFLOW controller determines whether the aging flow entries, which are delivered by the virtual switch as a proxy to the OPENFLOW switch when the secure channel is faulty, are all received by the OPENFLOW switch when the secure channel between the OPENFLOW switch and the OPENFLOW controller is restored, and re-delivering, to the OPENFLOW switch, an aging flow entry that is not received by the OPENFLOW switch when the aging flow entries are not all received by the OPENFLOW switch.

With reference to the first aspect or the first possible implementation manner of the first aspect, in a second possible implementation manner, the method further includes determining whether the reporting data packet is stored in the virtual switch when the reporting data packet matches none of aging flow entries in the aging flow table, and saving the reporting data packet when the reporting data packet is not stored in the virtual switch.

With reference to the first aspect, the first possible implementation manner of the first aspect, or the second possible implementation manner of the first aspect, in a third possible implementation manner, the method further includes reporting, to the OPENFLOW controller, reporting data packets that are stored in the virtual switch such that the OPENFLOW controller delivers, to the OPENFLOW switch, flow entries corresponding to the reporting data packets when the secure channel between the OPENFLOW switch and the OPENFLOW controller is restored.

With reference to the first aspect, the first possible implementation manner of the first aspect, the second possible implementation manner of the first aspect, or the third possible implementation manner of the first aspect, in a fourth possible implementation manner, the method further includes increasing a count of the reporting data packet by 1 when the reporting data packet is stored in the virtual switch, where the count represents a quantity of times the virtual switch receives the reporting data packet, and reporting, to the OPENFLOW controller, reporting data packets that are stored in the virtual switch includes sequentially reporting, to the OPENFLOW controller according to counts of the reporting data packets, the reporting data packets that are stored in the virtual switch such that the OPENFLOW controller sequentially delivers, to the OPENFLOW switch according to an order in which the reporting data packets reported by the virtual switch are received, flow entries corresponding to the reporting data packets.

According to a second aspect, a data packet forwarding method is provided, applied to an OPENFLOW controller in a network that includes an OPENFLOW switch, the OPENFLOW controller, and a virtual switch, where the method includes receiving at least one aging flow entry reported by the virtual switch, where the at least one aging flow entry is a matched aging flow entry that is delivered by the virtual switch as a proxy to the OPENFLOW switch after the virtual switch determines, when a secure channel between the OPENFLOW switch and the OPENFLOW controller is faulty, that a received reporting data packet sent by the OPENFLOW switch matches the aging flow entry in an aging flow table, where the aging flow table is used to store an aging flow entry that is deleted by the OPENFLOW switch, reported by the OPENFLOW switch, and received by the virtual switch after the secure channel is faulty, determining whether the at least one aging flow entry is stored in the OPENFLOW switch, and re-delivering the aging flow entry that is not stored to the OPENFLOW switch when at least one aging flow entry in the aging flow entry is not stored in the OPENFLOW switch.

In a first possible implementation manner of the second aspect, the method further includes receiving a reporting data packet reported by the virtual switch, where the reporting data packet is a reporting data packet that matches none of aging flow entries in the aging flow table and is sent by the OPENFLOW switch and received by the virtual switch when the secure channel between the OPENFLOW switch and the OPENFLOW controller is faulty, and delivering, to the OPENFLOW switch, a flow entry corresponding to the reporting data packet.

With reference to the second aspect or the first possible implementation manner of the second aspect, in a second possible implementation manner, receiving a reporting data packet reported by the virtual switch includes receiving reporting data packets that are sequentially reported by the virtual switch according to an order of counts of the reporting data packets, where the counts of the reporting data packets are obtained by separately and increasing the counts of the reporting data packets by 1 when the virtual switch receives the reporting data packets that match none of the aging flow entries in the aging flow table and are sent by the OPENFLOW switch, and determines that the reporting data packets are stored in the virtual switch, and delivering, to the OPENFLOW switch, a flow entry corresponding to the reporting data packet includes sequentially generating, according to an order in which the reporting data packets are received, flow entries corresponding to the reporting data packets, and delivering, to the OPENFLOW switch, the flow entries corresponding to the reporting data packets.

According to a third aspect, a data packet forwarding apparatus is provided, where the apparatus is applied in a virtual switch in a network that includes an OPENFLOW switch, an OPENFLOW controller, and the virtual switch, and the apparatus includes a first receiving module configured to store, in an aging flow table, a received aging flow entry that is deleted by the OPENFLOW switch and reported by the OPENFLOW switch when a secure channel between the OPENFLOW switch and the OPENFLOW controller is faulty, where the aging flow table is used to store an aging flow entry that is deleted, by the OPENFLOW switch after the secure channel is faulty, a first determining module configured to determine whether the reporting data packet that is sent by the OPENFLOW switch and received by the first receiving module matches an aging flow entry in the aging flow table, where the reporting data packet is generated by the OPENFLOW switch according to a forwarding data packet when the forwarding data packet is received and after the forwarding data packet fails to match a stored forwarding flow entry, and a first delivering module configured to deliver the matched aging flow entry to the OPENFLOW switch such that the OPENFLOW switch forwards the forwarding data packet according to the matched aging flow entry when the reporting data packet matches one aging flow entry in the aging flow table.

In a first possible implementation manner of the third aspect, the apparatus further includes a first reporting module configured to report, to the OPENFLOW controller, aging flow entries in the aging flow table that are already delivered to the OPENFLOW switch such that the OPENFLOW controller determines whether the aging flow entries, which are delivered by the virtual switch as a proxy to the OPENFLOW switch when the secure channel is faulty, are all received by the OPENFLOW switch when the secure channel between the OPENFLOW switch and the OPENFLOW controller is restored, and re-deliver, to the OPENFLOW switch, an aging flow entry that is not received by the OPENFLOW switch when the aging flow entries are not all received by the OPENFLOW switch.

With reference to the third aspect or the first possible implementation manner of the third aspect, in a second possible implementation manner, the apparatus further includes a second determining module configured to determine whether the reporting data packet is stored in the virtual switch when the reporting data packet matches none of aging flow entries in the aging flow table, and a storage module configured to store the reporting data packet when the reporting data packet is not stored in the virtual switch.

With reference to the third aspect, the first possible implementation manner of the third aspect, or the second possible implementation manner of the third aspect, in a third possible implementation manner, the apparatus further includes a second reporting module configured to report, to the OPENFLOW controller, reporting data packets that are stored in the virtual switch such that the OPENFLOW controller delivers, to the OPENFLOW switch, flow entries corresponding to the reporting data packets when the secure channel between the OPENFLOW switch and the OPENFLOW controller is restored.

With reference to the third aspect, the first possible implementation manner of the third aspect, the second possible implementation manner of the third aspect, or the third possible implementation manner of the third aspect, in a fourth possible implementation manner, the apparatus further includes an accumulating module configured to increase a count of the reporting data packet by 1 when the reporting data packet is stored in the virtual switch, where the count represents a quantity of times the virtual switch receives the reporting data packet, and the second reporting module is further configured to sequentially report, to the OPENFLOW controller according to counts of the reporting data packets, the reporting data packets that are stored in the virtual switch such that the OPENFLOW controller sequentially delivers, to the OPENFLOW switch according to an order in which the reporting data packets reported by the virtual switch are received, flow entries corresponding to the reporting data packets.

According to a fourth aspect, a data packet forwarding apparatus is provided, where the apparatus is applied in an OPENFLOW controller in a network that includes an OPENFLOW switch, the OPENFLOW controller, and a virtual switch, and the apparatus includes a second receiving module configured to receive at least one aging flow entry reported by the virtual switch, where the at least one aging flow entry is a matched aging flow entry that is delivered by the virtual switch as a proxy to the OPENFLOW switch after the virtual switch determines that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty, a third determining module configured to determine whether the at least one aging flow entry received by the second receiving module is stored in the OPENFLOW switch, and a second delivering module configured to re-deliver the aging flow entry that is not stored to the OPENFLOW switch when at least one aging flow entry in the aging flow table is not stored in the OPENFLOW switch.

In a first possible implementation manner of the fourth aspect, the apparatus further includes a third receiving module configured to receive a reporting data packet reported by the virtual switch, where the reporting data packet is a reporting data packet that matches none of aging flow entries in the aging flow table and is sent by the OPENFLOW switch and received by the virtual switch when the secure channel between the OPENFLOW switch and the OPENFLOW controller is faulty, and a third delivering module configured to deliver, to the OPENFLOW switch, a flow entry corresponding to the reporting data packet received by the third receiving module.

With reference to the fourth aspect or the first possible implementation manner of the fourth aspect, in a second possible implementation manner, the third receiving module is further configured to receive reporting data packets that are sequentially reported by the virtual switch according to an order of counts of the reporting data packets, where the counts of the reporting data packets are obtained by separately and increasing the counts of the reporting data packets by 1 when the virtual switch receives the reporting data packets that match none of the aging flow entries in the aging flow table and are sent by the OPENFLOW switch, and determines that the reporting data packets are stored in the virtual switch, and the third delivering module is further configured to sequentially generate, according to an order in which the reporting data packets are received, flow entries corresponding to the reporting data packets, and deliver, to the OPENFLOW switch, the flow entries corresponding to the reporting data packets.

According to a fifth aspect, a data packet forwarding system is provided, where the system includes a virtual switch, an OPENFLOW switch, and an OPENFLOW controller, where the virtual switch includes any one of the data packet forwarding apparatuses according to the third aspect and the possible implementation manners of the third aspect, and the OPENFLOW controller includes any one of the data packet forwarding apparatus according to the fourth aspect and the possible implementation manners of the fourth aspect.

According to a sixth aspect, a data packet forwarding apparatus is provided, where the apparatus is applied in a virtual switch in a network that includes an OPENFLOW switch, an OPENFLOW controller, and the virtual switch, and the apparatus includes a receiver, a processor, and a sender, where the processor is separately coupled with the receiver and the sender, and the receiver is configured to store, in an aging flow table, a received aging flow entry that is deleted by the OPENFLOW switch and reported by the OPENFLOW switch when a secure channel between the OPENFLOW switch and the OPENFLOW controller is faulty, where the aging flow table is used to store an aging flow entry that is deleted, by the OPENFLOW switch after the secure channel is faulty. The processor is configured to determine whether the reporting data packet that is sent by the OPENFLOW switch and received by the receiver matches an aging flow entry in the aging flow table, where the reporting data packet is generated by the OPENFLOW switch according to a forwarding data packet when the forwarding data packet is received and after the forwarding data packet fails to match a stored forwarding flow entry, and the sender is configured to deliver the matched aging flow entry to the OPENFLOW switch such that the OPENFLOW switch forwards the forwarding data packet according to the matched aging flow entry when the reporting data packet matches one aging flow entry in the aging flow table.

In a first possible implementation manner of the sixth aspect, the sender is further configured to report, to the OPENFLOW controller, aging flow entries in the aging flow table that are already delivered to the OPENFLOW switch such that the OPENFLOW controller determines whether the aging flow entries, which are delivered by the virtual switch as a proxy to the OPENFLOW switch when the secure channel is faulty, are all received by the OPENFLOW switch when the secure channel between the OPENFLOW switch and the OPENFLOW controller is restored, and re-deliver, to the OPENFLOW switch, an aging flow entry that is not received by the OPENFLOW switch when the aging flow entries are not all received by the OPENFLOW switch.

With reference to the sixth aspect or the first possible implementation manner of the sixth aspect, in a second possible implementation manner, the processor is further configured to determine whether the reporting data packet is stored in the virtual switch when the reporting data packet matches none of aging flow entries in the aging flow table, and the processor is further configured to store the reporting data packet when the reporting data packet is not stored in the virtual switch.

With reference to the sixth aspect, the first possible implementation manner of the sixth aspect, or the second possible implementation manner of the sixth aspect, in a third possible implementation manner, the sender is further configured to report, to the OPENFLOW controller, reporting data packets that are stored in the virtual switch such that the OPENFLOW controller delivers, to the OPENFLOW switch, flow entries corresponding to the reporting data packets when the secure channel between the OPENFLOW switch and the OPENFLOW controller is restored.

With reference to the sixth aspect, the first possible implementation manner of the sixth aspect, the second possible implementation manner of the sixth aspect, or the third possible implementation manner of the sixth aspect, in a fourth possible implementation manner, the processor is further configured to increase a count of the reporting data packet by 1 when the reporting data packet is stored in the virtual switch, where the count represents a quantity of times the virtual switch receives the reporting data packet, and the sender further is configured to sequentially reports, to the OPENFLOW controller according to counts of the reporting data packets, the reporting data packets that are stored in the virtual switch such that the OPENFLOW controller sequentially delivers, to the OPENFLOW switch according to an order in which the reporting data packets reported by the virtual switch are received, flow entries corresponding to the reporting data packets.

According to a seventh aspect, a data packet forwarding apparatus is provided, where the apparatus is applied in an OPENFLOW controller in a network that includes an OPENFLOW switch, the OPENFLOW controller, and a virtual switch, and the apparatus includes a receiver, a processor, and a sender, where the processor is separately coupled with the receiver and the sender, and the receiver is configured to receive at least one aging flow entry reported by the virtual switch, where the at least one aging flow entry is a matched aging flow entry that is delivered by the virtual switch as a proxy to the OPENFLOW switch after the virtual switch determines that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty. The processor is configured to determine whether the at least one aging flow entry received by the receiver is stored in the OPENFLOW switch, and the sender is configured to re-deliver the aging flow entry that is not stored to the OPENFLOW switch when the processor determines that at least one aging flow entry in the aging flow table is not stored in the OPENFLOW switch.

In a first possible implementation manner of the seventh aspect, the receiver is further configured to receive a reporting data packet reported by the virtual switch, where the reporting data packet is a reporting data packet that matches none of aging flow entries in the aging flow table and is sent by the OPENFLOW switch and received by the virtual switch when the secure channel between the OPENFLOW switch and the OPENFLOW controller is faulty, and the sender is further configured to deliver, to the OPENFLOW switch, a flow entry corresponding to the reporting data packet received by the receiver.

With reference to the seventh aspect or the first possible implementation manner of the seventh aspect, in a second possible implementation manner, the receiver is further configured to receive reporting data packets that are sequentially reported by the virtual switch according to an order of counts of the reporting data packets, where the counts of the reporting data packets are obtained by separately and increasing the counts of the reporting data packets by 1 when the virtual switch receives the reporting data packets that match none of the aging flow entries in the aging flow table and are sent by the OPENFLOW switch, and determines that the reporting data packets are stored in the virtual switch, and the sender is further configured to sequentially generate, according to an order in which the reporting data packets are received, flow entries corresponding to the reporting data packets, and deliver, to the OPENFLOW switch, the flow entries corresponding to the reporting data packets.

Beneficial effects brought by the technical solutions provided in the embodiments of the present disclosure are as follows.

A virtual switch performs matching between a pre-stored aging flow entry and a received reporting data packet sent by an OPENFLOW switch when a secure channel between the OPENFLOW switch and an OPENFLOW controller is faulty, and delivers the matched aging flow entry to the OPENFLOW switch such that the OPENFLOW switch forwards a forwarding data packet according to the aging flow entry when the matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received data packets corresponding to these flow entries cannot be forwarded, and consequently, the OPENFLOW switch loses a data exchange function. Because an aging flow entry that is deleted in an aging process by the OPENFLOW switch when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, when the secure channel between the OPENFLOW controller and the corresponding OPENFLOW switch is faulty, forwarding of an existing service flow can still continue when a flow entry corresponding to the existing service flow ages.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
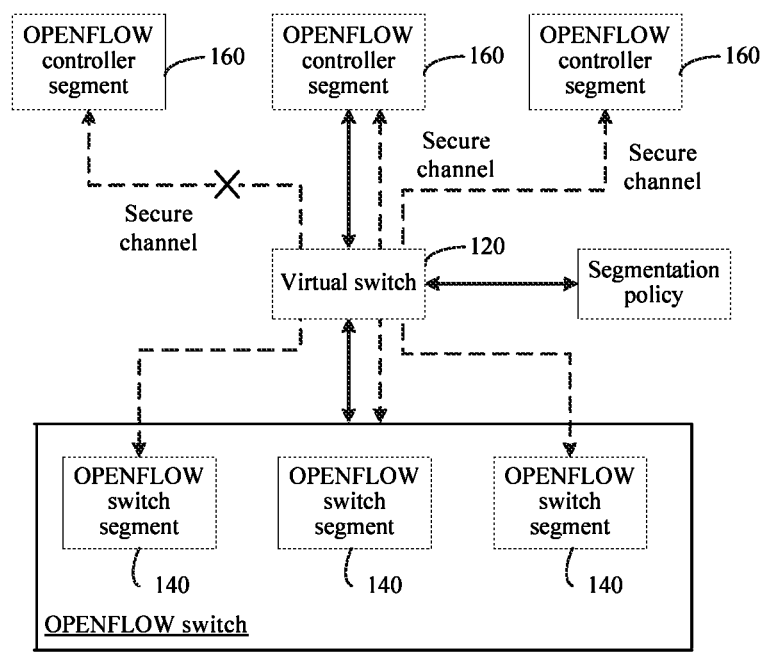
FIG. 1 is a schematic diagram of an implementation environment related to a data packet forwarding method according to some embodiments of the present disclosure.

FIG. 1 is a schematic diagram of an implementation environment related to a data packet forwarding method according to some embodiments of the present disclosure. The implementation environment may include a virtual switch 120, at least one OPENFLOW switch, and at least one OPENFLOW controller 160.

The virtual switch 120 may be a FlowVisor. The FlowVisor may divide the OPENFLOW switch into multiple OPENFLOW switch segments 140 using a segmentation policy. Each OPENFLOW switch segment 140 is controlled by one OPENFLOW controller segment 160. Further, several OPENFLOW switches may be divided into one OPENFLOW switch segment, or one OPENFLOW switch may be divided into different OPENFLOW switch segments according to the segmentation policy. Generally, for the OPENFLOW switch segment 140, the virtual switch 120 is one OPENFLOW controller, and for the OPENFLOW controller segment, the virtual switch 120 is one OPENFLOW switch. Therefore, the virtual switch 120 may intercept, modify, and forward all information exchanged between the OPENFLOW switch segment 140 and the OPENFLOW controller segment 160, for example, a PacketIn reported by the OPENFLOW switch segment 140 and a flow entry delivered by the OPENFLOW controller segment 160.

In an OPENFLOW network, an OPENFLOW switch segment 140 is in one-to-one correspondence with an OPENFLOW controller segment 160. Each group of a corresponding OPENFLOW switch segment 140 and OPENFLOW controller segment 160 are connected using a secure channel. A flow table is stored in an OPENFLOW switch segment 140, and at least one flow entry is stored in the flow table. The OPENFLOW switch segment 140 may first forward the forwarding data packet according to the flow entry when a forwarding data packet is received. The OPENFLOW switch segment 140 searches flow entries stored in the flow table, and forwards the forwarding data packet according to the flow entry when the forwarding data packet can match one flow entry in the flow entries, or the OPENFLOW switch segment 140 creates a PacketIn and reports the PacketIn to a corresponding OPENFLOW controller segment 160 through a secure channel when the forwarding data packet cannot match any flow entry. The OPENFLOW controller segment 160 determines a forwarding action (that is, a flow entry) of the forwarding data packet according to the PacketIn and delivers a new flow entry to the OPENFLOW switch segment 140 through the secure channel. The OPENFLOW switch segment 140 forwards the forwarding data packet according to the flow entry delivered by the OPENFLOW controller segment 160.

Because the OPENFLOW switch segment 140 is logically one OPENFLOW switch and the OPENFLOW controller segment is logically one OPENFLOW controller, in this specification, for ease of description, the OPENFLOW switch segment 140 is considered as one OPENFLOW switch and the OPENFLOW controller segment 160 is considered as one OPENFLOW controller. Unless otherwise specified, the "OPENFLOW switch" described in this specification is one of the OPENFLOW switch segments 140 shown in FIG. 1. Unless otherwise specified, the "OPENFLOW controller" described in this specification is an OPENFLOW controller segment 160 that is corresponding to the OPENFLOW switch segment 140 and shown in FIG. 1.

Figure 2:
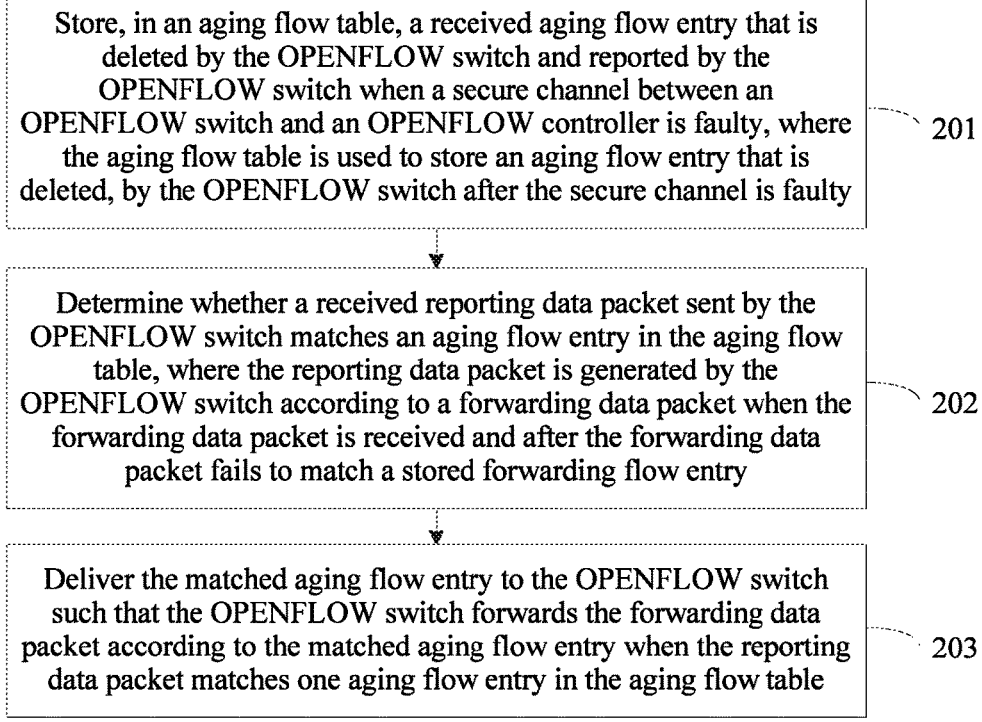
FIG. 2 is a method flowchart of a data packet forwarding method according to an embodiment of the present disclosure.

Referring to FIG. 2, FIG. 2 shows a method flowchart of a data packet forwarding method according to an embodiment of the present disclosure. As an embodiment, the data packet forwarding method is applied in a virtual switch 120 in the implementation environment shown in FIG. 1. The data packet forwarding method may include the following steps.

Step 201: Store, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted, by the OPENFLOW switch, after the secure channel is faulty.

Step 202: Determine whether a received reporting data packet sent by the OPENFLOW switch matches an aging flow entry in the aging flow table, where the reporting data packet is generated by the OPENFLOW switch according to a forwarding data packet when the forwarding data packet is received and after the forwarding data packet fails to match a stored forwarding flow entry.

Step 203: Deliver the matched aging flow entry to the OPENFLOW switch such that the OPENFLOW switch forwards the forwarding data packet according to the matched aging flow entry when the reporting data packet matches one aging flow entry in the aging flow table.

In conclusion, according to the data packet forwarding method provided in this embodiment of the present disclosure, when a secure channel between an OPENFLOW switch and an OPENFLOW controller is faulty, a virtual switch performs matching between a prestored aging flow entry and a received reporting data packet sent by the OPENFLOW switch. The virtual switch delivers the matched aging flow entry to the OPENFLOW switch such that the OPENFLOW switch forwards a forwarding data packet according to the aging flow entry when the matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch during a period when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, the following effect is achieved. Forwarding of an existing service flow can still continue when a flow entry corresponding to the existing service flow ages, and when the secure channel between the OPENFLOW controller and the corresponding OPENFLOW switch is faulty.

Figure 3:
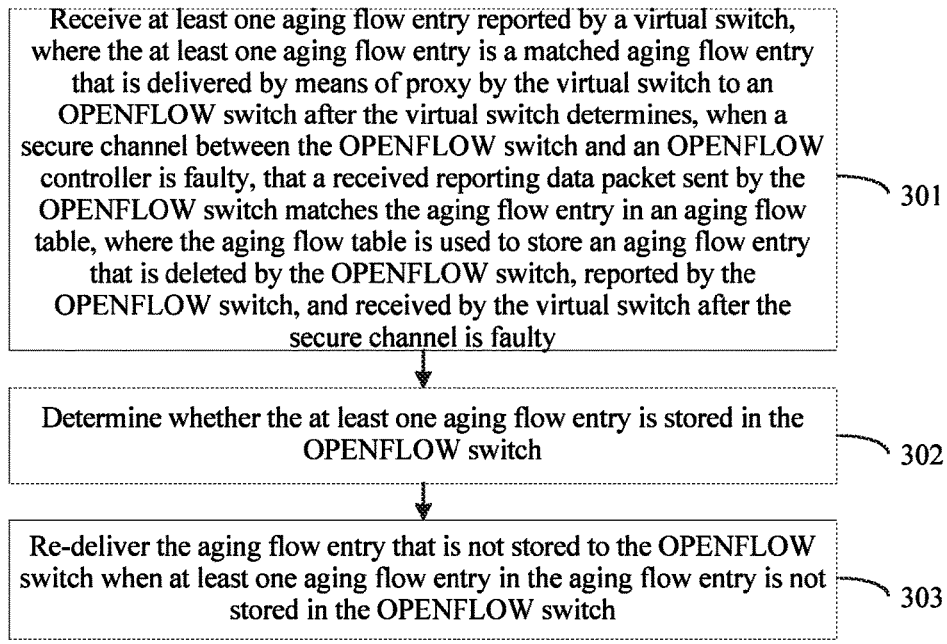
FIG. 3 is a method flowchart of a data packet forwarding method according to another embodiment of the present disclosure.

Referring to FIG. 3, FIG. 3 shows a method flowchart of a data packet forwarding method according to another embodiment of the present disclosure. As an embodiment, the data packet forwarding method is applied in an OPENFLOW controller segment 160 in the implementation environment shown in FIG. 1. The data packet forwarding method may include the following steps.

Step 301: Receive at least one aging flow entry reported by a virtual switch, where the at least one aging flow entry is a matched aging flow entry that is delivered by the virtual switch as a proxy to an OPENFLOW switch after the virtual switch determines, when a secure channel between the OPENFLOW switch and an OPENFLOW controller is faulty, that a received reporting data packet sent by the OPENFLOW switch matches the aging flow entry in an aging flow table, where the aging flow table is used to store an aging flow entry that is deleted by the OPENFLOW switch, reported by the OPENFLOW switch, and received by the virtual switch after the secure channel is faulty.

Step 302: Determine whether the at least one aging flow entry is stored in the OPENFLOW switch.

Step 303: Re-deliver the aging flow entry that is not stored to the OPENFLOW switch when at least one aging flow entry in the aging flow entry is not stored in the OPENFLOW switch.

In conclusion, according to the data packet forwarding method provided in this embodiment of the present disclosure the OPENFLOW controller acquires an aging flow entry delivered by a virtual switch as a proxy, and determines correctness of the aging flow entry delivered by the virtual switch as a proxy after a secure channel between an OPENFLOW switch and an OPENFLOW controller is restored, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect, an aging flow entry delivered by the virtual switch as a proxy after the secure channel is restored, the OPENFLOW controller re-delivers the aging flow entries when the virtual switch fails to deliver some aging flow entries to the OPENFLOW switch, thereby achieving an effect that the OPENFLOW switch can normally forward a subsequent forwarding data packet in a same flow immediately.

In an actual application, when a secure channel between an OPENFLOW switch and an OPENFLOW controller is faulty, a virtual switch can act as a proxy of the OPENFLOW controller to deliver an aging flow entry to the OPENFLOW switch, and report, after the secure channel is restored, a status of the proxy delivery to the OPENFLOW controller such that the OPENFLOW controller can determine correctness of the proxy delivery performed by the virtual switch when the secure channel is faulty. For details, refer to the following description of FIG. 4.

Figure 4:
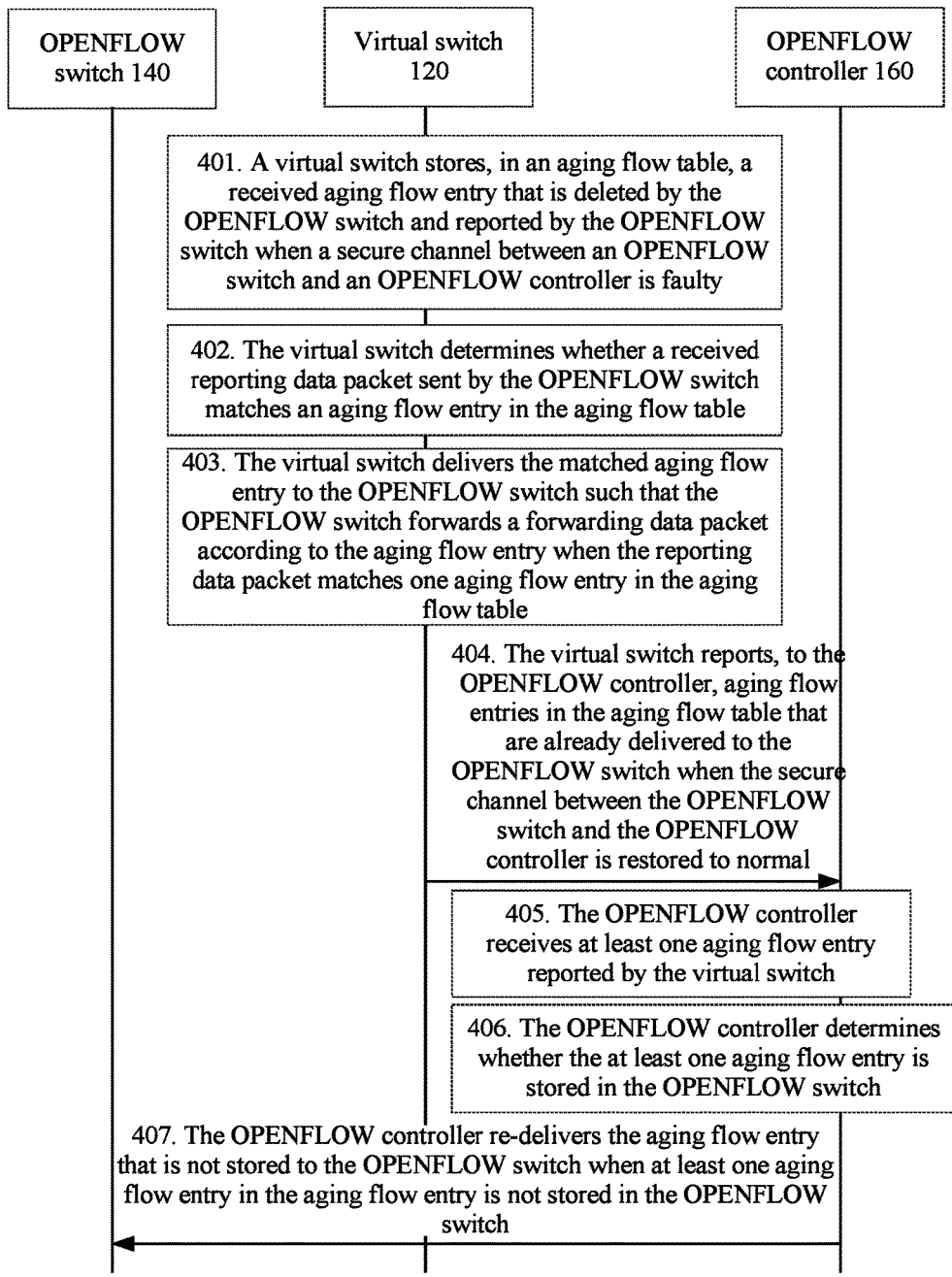
FIG. 4 is a method flowchart of a data packet forwarding method according to still another embodiment of the present disclosure.

Referring to FIG. 4, FIG. 4 shows a method flowchart of a data packet forwarding method according to still another embodiment of the present disclosure. As an embodiment, the data packet forwarding method is applied in the implementation environment shown in FIG. 1. The data packet forwarding method may include the following steps.

Step 401: A virtual switch stores, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted, after the secure channel is faulty, by the OPENFLOW switch.

In an actual application, after receiving a forwarding data packet, an OPENFLOW switch determines whether the forwarding data packet matches one flow entry in a flow table, and forwards the forwarding data packet according to the flow entry when the matching is successful. For a flow entry, to improve matching efficiency, the OPENFLOW switch deletes the flow entry (the deleted flow entry is referred to as an aging flow entry) and notifies the OPENFLOW controller of the deleted aging flow entry when the flow entry is not hit by a forwarding data packet for a long time. Correspondingly, the virtual switch may intercept and store the aging flow entry that is sent by the OPENFLOW switch to the OPENFLOW controller.

It should be additionally noted that, generally, when the secure channel between an OPENFLOW switch and an OPENFLOW controller is faulty, the virtual switch allocates at least one storage area in storage areas of the virtual switch, where the storage area that is allocated is used to store an intercepted aging flow entry.

Step 402: The virtual switch determines whether a received reporting data packet sent by the OPENFLOW switch matches an aging flow entry in the aging flow table, where the reporting data packet is generated by the OPENFLOW switch according to a forwarding data packet when the forwarding data packet is received and after the forwarding data packet fails to match a stored forwarding flow entry.

In an actual application, when the OPENFLOW switch receives a forwarding data packet and the forwarding data packet cannot match a flow entry stored in the OPENFLOW switch, the OPENFLOW switch generates a reporting data packet for the forwarding data packet and sends the reporting data packet to the OPENFLOW controller through the secure channel. In this case, the virtual switch can intercept the reporting data packet. Because the secure channel is already faulty, the OPENFLOW controller cannot receive the reporting data packet. The virtual switch needs to determine whether an aging flow entry that can match the reporting data packet exists in the aging flow table each time when a reporting data packet reported by the OPENFLOW switch is received.

Step 403: The virtual switch delivers the matched aging flow entry to the OPENFLOW switch such that the OPEN-FLOW switch forwards the forwarding data packet according to the aging flow entry when the reporting data packet matches one aging flow entry in the aging flow table.

When the reporting data packet matches one aging flow entry in the aging flow table, it indicates that the forwarding data packet corresponding to the reporting data packet can be forwarded using the aging flow entry, and in this case, the virtual switch delivers the matched aging flow entry to the OPENFLOW switch. In this way, the OPENFLOW switch can forward, according to the received aging flow entry, the forwarding data packet and a subsequent forwarding data packet that is in a same flow as the forwarding data packet.

Step 404: The virtual switch reports, to the OPENFLOW controller, aging flow entries in the aging flow table that are already delivered to the OPENFLOW switch when the secure channel between the OPENFLOW switch and the OPENFLOW controller is restored to normal.

The virtual switch acts as a proxy of the OPENFLOW controller to send the aging flow entry to the OPENFLOW switch when the secure channel between the OPENFLOW switch and the OPENFLOW controller is faulty, but the OPENFLOW controller does not know which flow entry is delivered by the virtual switch as a proxy of the OPEN-FLOW controller, and the virtual switch cannot ensure that a flow entry is successfully delivered by the virtual switch. Therefore, to ensure that the OPENFLOW controller can know which flow entry is delivered by the virtual switch as a proxy of the OPENFLOW controller and that whether the flow entry is successfully delivered by the virtual switch as a proxy can be verified, the virtual switch reports, to the OPENFLOW controller, the aging flow entry delivered by the virtual switch as a proxy to the OPENFLOW switch when the secure channel between the OPENFLOW switch and the OPENFLOW controller is restored.

Step 405: The OPENFLOW controller receives at least one aging flow entry reported by the virtual switch.

Step 406: The OPENFLOW controller determines whether the at least one aging flow entry is stored in the OPENFLOW switch.

When the secure channel is faulty, because the virtual switch acts as a proxy of the OPENFLOW controller to deliver the aging flow entry to the OPENFLOW switch, it is necessary for the OPENFLOW controller to verify correctness of the proxy delivery performed by the virtual switch, that is, verify whether the aging flow entry delivered by the virtual switch as a proxy is correctly delivered to the OPENFLOW switch, and in this case, the OPENFLOW switch determines whether the aging flow entries is stored in the OPENFLOW switch.

Step 407: The OPENFLOW controller re-delivers the aging flow entry that is not stored to the OPENFLOW switch when at least one aging flow entry in the aging flow entry is not stored in the OPENFLOW switch.

When the OPENFLOW controller determines that one or more aging flow entries are not stored in the OPENFLOW switch, it indicates that the virtual switch fails to deliver, as a proxy, the one or more aging flow entries, and in this case, the OPENFLOW controller re-delivers the one or more aging flow entries to the OPENFLOW switch such that the OPENFLOW switch can directly use a matched aging flow entry to forward these forwarding data packets, thereby improving a matching speed when receiving a subsequent forwarding data packet that is in a same flow as a forwarding data packet corresponding to the one or more aging flow entries.

In conclusion, according to the data packet forwarding method provided in this embodiment of the present disclosure, when a secure channel between an OPENFLOW switch and an OPENFLOW controller is faulty, a virtual switch takes the place of the OPENFLOW controller to deliver aging flow entries to the OPENFLOW switch, and when the secure channel is restored, notifies the OPEN-FLOW controller of these aging flow entries delivered through proxy such that the OPENFLOW controller verifies the aging flow entries delivered by the virtual switch as a proxy. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. The OPENFLOW controller can verify an aging flow entry delivered by a virtual switch as a proxy when the secure channel is restored, and re-deliver an aging flow entry that fails to be delivered through proxy, thereby achieving an effect that the aging flow entry is re-delivered at a highest speed to improve matching and data packet forwarding efficiency.

In an actual application, when a secure channel between an OPENFLOW switch and an OPENFLOW controller is faulty, because a virtual switch does not have a function of generating flow entries for new reporting data packets, the virtual switch may temporarily store the new reporting data packets, and after the secure channel is restored, report the stored new reporting data packets to the OPENFLOW controller such that the OPENFLOW controller can immediately generate flow entries for these new reporting data packets. For details, refer to the following description of FIG. 5.

Figure 5:
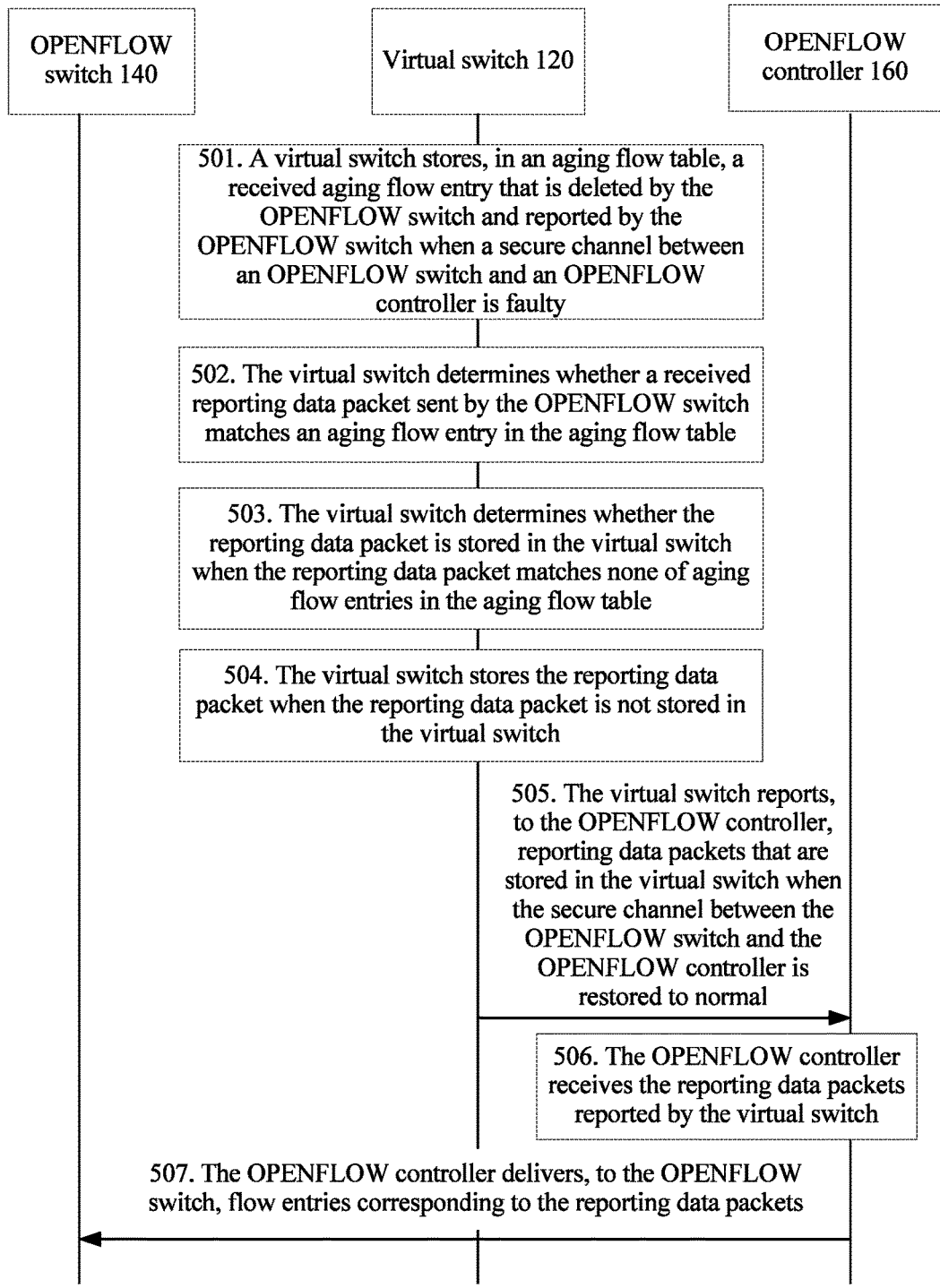
FIG. 5 is a method flowchart of a data packet forwarding method according to yet another embodiment of the present disclosure.

Referring to FIG. 5, FIG. 5 shows a method flowchart of a data packet forwarding method according to yet another embodiment of the present disclosure. As an embodiment, the data packet forwarding method is applied in the implementation environment shown in FIG. 1. The data packet forwarding method may include the following steps.

Step 501: A virtual switch stores, in an aging flow table, a received aging flow entry that is deleted by an OPEN-FLOW switch and reported by the OPENFLOW switch when a secure channel between the OPENFLOW switch and an OPENFLOW controller is faulty, where the aging flow table is used to store an aging flow entry that is deleted by the OPENFLOW switch after the secure channel is faulty.

Step 502: The virtual switch determines whether a received reporting data packet sent by the OPENFLOW switch matches an aging flow entry in the aging flow table, where the reporting data packet is generated by the OPEN-FLOW switch according to a forwarding data packet when the forwarding data packet is received and after the forwarding data packet fails to match a stored forwarding flow entry.

The foregoing steps 501 and 502 are in one-to-one correspondence with steps 401 and 402 in FIG. 4. For detailed content, refer to the description of the steps 401 and 402 in FIG. 4. To avoid repetition, details are not described herein again.

Step 503: The virtual switch determines whether the reporting data packet is stored in the virtual switch when the reporting data packet matches none of aging flow entries in the aging flow table.

In an actual application, a virtual switch may allocate a storage area that is used to store a reporting data packet when a secure channel between an OPENFLOW switch and an OPENFLOW controller is faulty, and determine whether the reporting data packet is stored in the storage area that is used to store the reporting data packet when the reporting data packet matches none of pre-stored aging flow entries.

Generally, the storage area that is used to store the reporting data packet and a storage area that is used to store the aging flow entry may be two different storage areas. These two different storage areas may both be storage areas that are allocated by the virtual switch when the secure channel is faulty, or may be a storage area that is used to store the aging flow entry and is allocated by the virtual switch when the virtual switch prepares to store the aging flow entry for the first time, and a storage area that is used to store the reporting data packet and is allocated by virtual switch when the virtual switch prepares to store the reporting data packet.

Step 504: The virtual switch stores the reporting data packet when the reporting data packet is not stored in the virtual switch.

Step 505: The virtual switch reports, to the OPENFLOW controller, reporting data packets that are stored in the virtual switch when the secure channel between the OPENFLOW switch and the OPENFLOW controller is restored to normal.

Likewise, to ensure that the OPENFLOW switch can acquire flow entries corresponding to the reporting data packets more quickly, when the secure channel between the OPENFLOW switch and the OPENFLOW controller is restored, the virtual switch reports, to the OPENFLOW controller, the stored reporting data packets.

Step 506: The OPENFLOW controller receives the reporting data packets reported by the virtual switch.

Step 507: The OPENFLOW controller delivers, to the OPENFLOW switch, flow entries corresponding to the reporting data packets.

The OPENFLOW controller generates the flow entries for these reporting data packets, and delivers the generated flow entries to the OPENFLOW switch after receiving the reporting data packets reported by the virtual switch.

It can be learned that, once a secure channel between an OPENFLOW switch and an OPENFLOW controller is restored, the OPENFLOW controller immediately acquires reporting data packets that are reported by a virtual switch, generates flow entries for these reporting data packets, and delivers these flow entries to the OPENFLOW switch such that, when receiving a forwarding data packet that is in a same flow as a forwarding data packet corresponding to these flow entries, the OPENFLOW switch can immediately forwards, according to these flow entries, the forwarding data packet that is in the same flow.

In conclusion, according to the data packet forwarding method provided in this embodiment of the present disclosure, after a secure channel between an OPENFLOW switch and an OPENFLOW controller is restored, the OPENFLOW controller acquires reporting data packets that are stored in a virtual switch, generates flow entries for these reporting data packets, and delivers these flow entries to the OPENFLOW switch such that the OPENFLOW switch can immediately perform, forwarding according to these flow entries when receiving a related forwarding data packet. After the secure channel is restored, the OPENFLOW controller can generate the flow entries for the reporting data packets that are acquired by the OPENFLOW switch when the secure channel is faulty, and deliver the generated flow entry to the OPENFLOW switch, and generally, forwarding data packets that are in a same flow are continuously sent within a short time. Therefore, the OPENFLOW switch further receives a relatively large quantity of subsequent forwarding data packets that are in a same flow as a forwarding data packet corresponding to these flow entries, and in this case, the OPENFLOW switch may forward these subsequently received forwarding data packets according to the flow entries, thereby achieving an effect that it can be ensured that normal forwarding can be quickly performed by the OPENFLOW switch on subsequent forwarding data packets that are in the same flow as a forwarding data packet corresponding to these flow entries.

In an actual application, when a secure channel between an OPENFLOW switch and an OPENFLOW controller is faulty, because a virtual switch does not have a function of generating flow entries for new reporting data packets, the virtual switch may temporarily store the new reporting data packets. To ensure that the OPENFLOW controller can first receive a more important new reporting data packet, the virtual switch can further rank the new reporting data packets according to a quantity of the new reporting data packets, and after the secure channel is restored, report the stored new reporting data packets to the OPENFLOW controller in order such that the OPENFLOW controller can immediately generate, in order, flow entries for these new reporting data packets. For details, refer to the description of FIG. 6.

Figure 6:
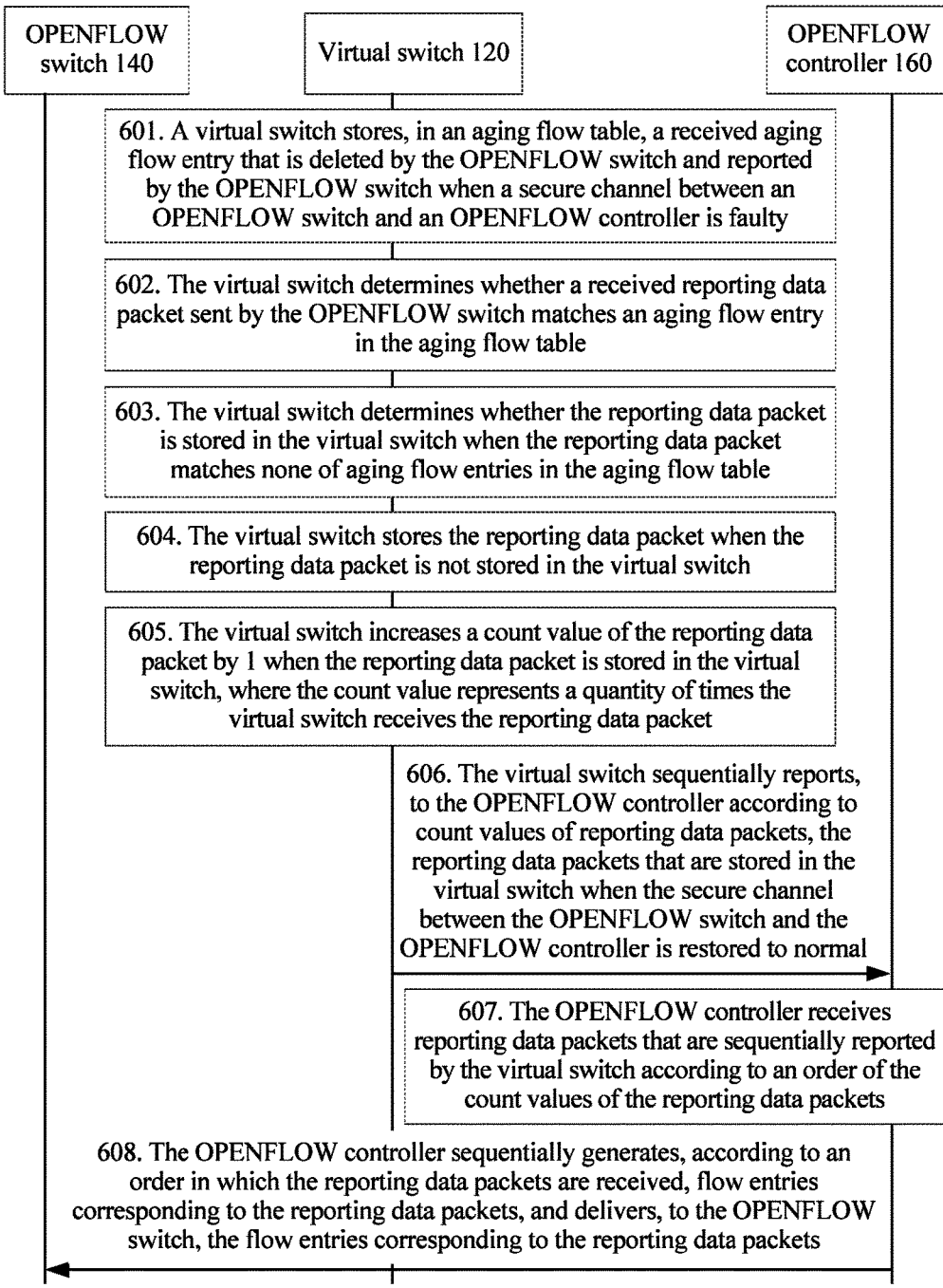
FIG. 6 is a method flowchart of a data packet forwarding method according to still yet another embodiment of the present disclosure.

Referring to FIG. 6, FIG. 6 shows a method flowchart of a data packet forwarding method according to still yet another embodiment of the present disclosure. As an embodiment, the data packet forwarding method is applied in the implementation environment shown in FIG. 1. The data packet forwarding method may include the following steps.

Step 601: A virtual switch stores, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted by the OPENFLOW switch after the secure channel is faulty.

Step 602: The virtual switch determines whether a received reporting data packet sent by the OPENFLOW switch matches an aging flow entry in the aging flow table, where the reporting data packet is generated by the OPENFLOW switch according to a forwarding data packet when the forwarding data packet is received and after the forwarding data packet fails to match a stored forwarding flow entry.

Step 603: The virtual switch determines whether the reporting data packet is stored in the virtual switch when the reporting data packet matches none of aging flow entries in the aging flow table.

Step 604: The virtual switch stores the reporting data packet when the reporting data packet is not stored in the virtual switch.

The foregoing steps 601 to 604 are in one-to-one correspondence with steps 501 to 504 in FIG. 5. For detailed content, refer to the description of steps 501 to 504 in FIG. 5. To avoid repetition, details are not described herein again.

Step 605: The virtual switch increases a count value of the reporting data packet by 1 when the reporting data packet is stored in the virtual switch, where the count represents a quantity of times the virtual switch receives the reporting data packet.

A reporting data packet is generated according to an acquired forwarding data packet, and generally, a same reporting data packet is generated for forwarding data packets that are in a same flow. Therefore, when the reporting data packet is stored in the virtual switch, it indicates that the OPENFLOW switch receives forwarding data packets that are in a same flow as the acquired forwarding data packet.

Generally, when there are a relatively large quantity of same reporting data packets, it indicates that there are also a relatively large quantity of forwarding data packets that are in a same flow. In order to ensure that a quantity of times these forwarding data packets that are in the same flow fail to be forwarded by the OPENFLOW switch can be minimized, in this case, same reporting data packets need to be accumulated to obtain an accumulated count.

Step 606: The virtual switch sequentially reports, to the OPENFLOW controller according to counts of reporting data packets, the reporting data packets that are stored in the virtual switch when the secure channel between the OPENFLOW switch and the OPENFLOW controller is restored.

Generally, a reporting data packet with a larger count is first reported to the OPENFLOW controller and then a reporting data packet with a smaller count is reported to the OPENFLOW controller.

Step 607: The OPENFLOW controller receives reporting data packets that are sequentially reported by the virtual switch according to an order of the counts of the reporting data packets.

Step 608: The OPENFLOW controller sequentially generates, according to an order in which the reporting data packets are received, flow entries corresponding to the reporting data packets, and delivers, to the OPENFLOW switch, the flow entries corresponding to the reporting data packets.

That is, the OPENFLOW controller first generates a flow entry for a reporting data packet with a larger count and delivers the flow entry to the OPENFLOW switch earlier. In this way, the OPENFLOW switch can forward earlier, according to the flow entry, a matchable forwarding data packet that is in a same flow as a forwarding data packet corresponding to the flow entry.

In conclusion, according to the data packet forwarding method provided in this embodiment of the present disclosure, after a secure channel between an OPENFLOW switch and an OPENFLOW controller is restored, the OPENFLOW controller acquires an aging flow entry delivered by a virtual switch as a proxy, and determines correctness of the aging flow entry delivered by the virtual switch as a proxy, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect an aging flow entry delivered by the virtual switch as a proxy, when the virtual switch fails to deliver some aging flow entries to the OPENFLOW switch, the OPENFLOW controller re-delivers the aging flow entries after the secure channel is restored. In this way, thereby achieving an effect that the OPENFLOW switch can normally forward a subsequent forwarding data packet in a same flow immediately.

Figure 7:
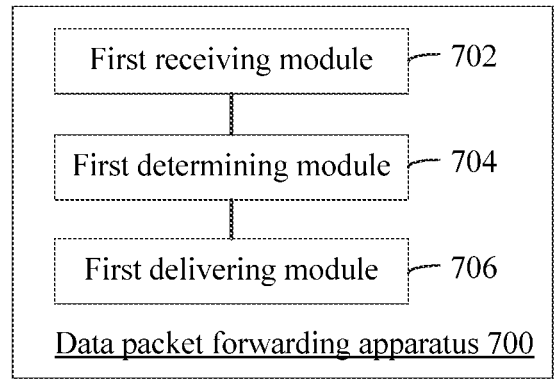
FIG. 7 is a schematic structural diagram of a data packet forwarding apparatus according to an embodiment of the present disclosure.

Referring to FIG. 7, FIG. 7 shows a schematic structural diagram of a data packet forwarding apparatus according to an embodiment of the present disclosure. As an embodiment, the data packet forwarding apparatus 700 is applied in a virtual switch 120 in the implementation environment shown in FIG. 1. The data packet forwarding apparatus 700 may include a first receiving module 702, a first determining module 704, and a first delivering module 706.

The first receiving module 702 may be configured to store, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted, by the OPENFLOW switch after the secure channel is faulty.

The first determining module 704 may be configured to determine whether a reporting data packet that is sent by the OPENFLOW switch and received by the first receiving module 702 matches an aging flow entry in the aging flow table, where the reporting data packet is generated by the OPENFLOW switch according to a forwarding data packet when the forwarding data packet is received and after the forwarding data packet fails to match a stored forwarding flow entry.

The first delivering module 706 may be configured to deliver the matched aging flow entry to the OPENFLOW switch such that the OPENFLOW switch forwards the forwarding data packet according to the matched aging flow entry when the reporting data packet matches one aging flow entry in the aging flow table.

In conclusion, according to the data packet forwarding apparatus provided in this embodiment of the present disclosure, when a secure channel between an OPENFLOW switch and an OPENFLOW controller is faulty, a virtual switch performs matching between a pre-stored aging flow entry and a received reporting data packet sent by the OPENFLOW switch, and delivers the matched aging flow entry to the OPENFLOW switch such that the OPENFLOW switch forwards a forwarding data packet according to the aging flow entry when matching is successful. This resolves the following problem in the prior art that is when a secure channel between an OPENFLOW controller and a corresponding OPENFLOW switch is faulty, when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, when the secure channel between the OPENFLOW controller and the corresponding OPENFLOW switch is faulty, forwarding of an existing service flow can still continue when a flow entry corresponding to the existing service flow ages.

Figure 8:
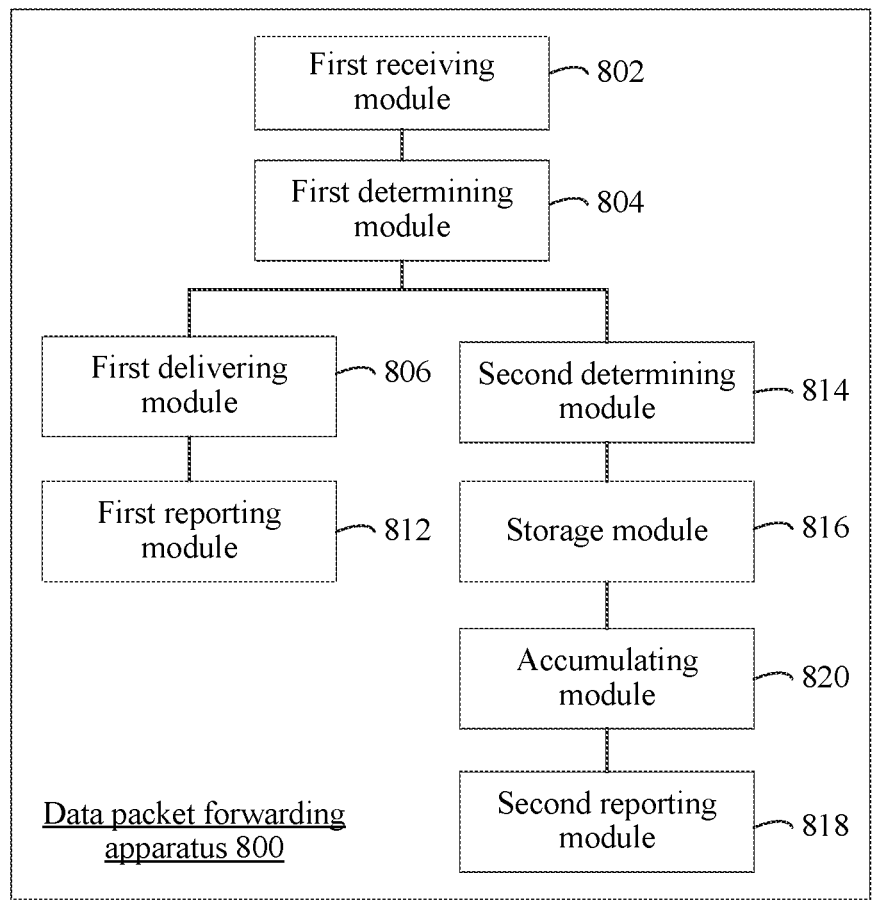
FIG. 8 is a schematic structural diagram of a data packet forwarding apparatus according to another embodiment of the present disclosure.

Referring to FIG. 8, FIG. 8 shows a schematic structural diagram of a data packet forwarding apparatus according to another embodiment of the present disclosure. As an embodiment, the data packet forwarding apparatus 800 is applied in a virtual switch 120 in the implementation environment shown in FIG. 1. The data packet forwarding apparatus 800 may include a first receiving module 802, a first determining module 804, and a first delivering module 806.

The first receiving module 802 may be configured to store, in an aging flow table, a received aging flow entry that is deleted by an OPENFLOW switch and reported by the OPENFLOW switch when a secure channel between the OPENFLOW switch and an OPENFLOW controller is faulty, where the aging flow table is used to store an aging flow entry that is deleted, by the OPENFLOW switch after the secure channel is faulty.

The first determining module 804 may be configured to determine whether a reporting data packet that is sent by the OPENFLOW switch and received by the first receiving module 802 matches an aging flow entry in the aging flow table, where the reporting data packet is generated by the OPENFLOW switch according to a forwarding data packet when the forwarding data packet is received and after the forwarding data packet fails to match a stored forwarding flow entry.

The first delivering module 806 may be configured to deliver the matched aging flow entry to the OPENFLOW switch such that the OPENFLOW switch forwards the forwarding data packet according to the matched aging flow entry when the reporting data packet matches one aging flow entry in the aging flow table.

In a first possible implementation manner of this embodiment, the data packet forwarding apparatus 800 may further include a first reporting module 812.

The first reporting module 812 may be configured to report, to the OPENFLOW controller, aging flow entries in the aging flow table that are already delivered to the OPENFLOW switch such that the OPENFLOW controller determines whether the aging flow entries, which are delivered by the virtual switch as a proxy to the OPENFLOW switch when the secure channel is faulty, are all received by the OPENFLOW switch when the secure channel between the OPENFLOW switch and the OPENFLOW controller is restored, and re-deliver, to the OPENFLOW switch, an aging flow entry that is not received by the OPENFLOW switch when the aging flow entries are not all received by the OPENFLOW switch.

In a second possible implementation manner of this embodiment, the data packet forwarding apparatus 800 may further include a second determining module 814 and a storage module 816.

The second determining module 814 may be configured to determine whether the reporting data packet is stored in the virtual switch when the reporting data packet matches none of aging flow entries in the aging flow table.

The storage module 816 may be configured to store the reporting data packet when the reporting data packet is not stored in the virtual switch.

In a third possible implementation manner of this embodiment, the data packet forwarding apparatus 800 may further include a second reporting module 818.

The second reporting module 818 may be configured to report, to the OPENFLOW controller, reporting data packets that are stored in the virtual switch such that the OPENFLOW controller delivers, to the OPENFLOW switch, flow entries corresponding to the reporting data packets when the secure channel between the OPENFLOW switch and the OPENFLOW controller is restored.

In a fourth possible implementation manner of this embodiment, the data packet forwarding apparatus 800 may further include an accumulating module 820.

The accumulating module 820 may be configured to increase a count of the reporting data packet by 1 when the reporting data packet is stored in the virtual switch, where the count represents a quantity of times the virtual switch receives the reporting data packet.

The second reporting module 818 may be further configured to sequentially report, to the OPENFLOW controller according to counts of the reporting data packets, the reporting data packets that are stored in the virtual switch such that the OPENFLOW controller sequentially delivers, to the OPENFLOW switch according to an order in which the reporting data packets reported by the virtual switch are received, flow entries corresponding to the reporting data packets.

In conclusion, according to the data packet forwarding apparatus provided in this embodiment of the present disclosure, a virtual switch performs matching between a pre-stored aging flow entry and a received reporting data packet sent by the OPENFLOW switch when a secure channel between an OPENFLOW switch and an OPENFLOW controller is faulty, and delivers the matched aging flow entry to the OPENFLOW switch such that the OPENFLOW switch forwards a forwarding data packet according to the aging flow entry when the matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch during a period when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, the following effect is achieved. Forwarding of an existing service flow can still continue when a flow entry corresponding to the existing service flow ages, and when the secure channel between the OPENFLOW controller and the corresponding OPENFLOW switch is faulty.

Figure 9:
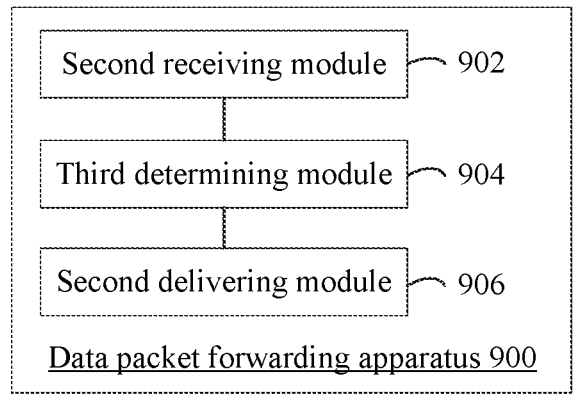
FIG. 9 is a schematic structural diagram of a data packet forwarding apparatus according to still another embodiment of the present disclosure.

Referring to FIG. 9, FIG. 9 shows a schematic structural diagram of a data packet forwarding apparatus according to still another embodiment of the present disclosure. As an embodiment, the data packet forwarding apparatus 900 is applied in an OPENFLOW controller segment 160 in the implementation environment shown in FIG. 1. The data packet forwarding apparatus 900 may include a second receiving module 902, a third determining module 904, and a second delivering module 906.

The second receiving module 902 may be configured to receive at least one aging flow entry reported by the virtual switch, where the at least one aging flow entry is a matched aging flow entry that is delivered by the virtual switch as a proxy to the OPENFLOW switch after the virtual switch determines, that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty.

The third determining module 904 may be configured to determine whether the at least one aging flow entry received by the second receiving module 902 is stored in the OPENFLOW switch.

The second delivering module 906 may be configured to re-deliver the aging flow entry that is not stored to the OPENFLOW switch when at least one aging flow entry in the aging flow table is not stored in the OPENFLOW switch.

In conclusion, according to the data packet forwarding apparatus provided in this embodiment of the present disclosure, the OPENFLOW controller acquires an aging flow entry delivered by a virtual switch as a proxy, and determines correctness of the aging flow entry delivered by the virtual switch as a proxy after a secure channel between an OPENFLOW switch and an OPENFLOW controller is restored, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect, an aging flow entry delivered by the virtual switch as a proxy after the secure channel is restored, and the OPENFLOW controller re-delivers the aging flow entries when the virtual switch fails to deliver some aging flow entries to the OPENFLOW switch, thereby achieving an effect that the OPENFLOW switch can normally forward a subsequent forwarding data packet that is in a same flow immediately.

Figure 10:
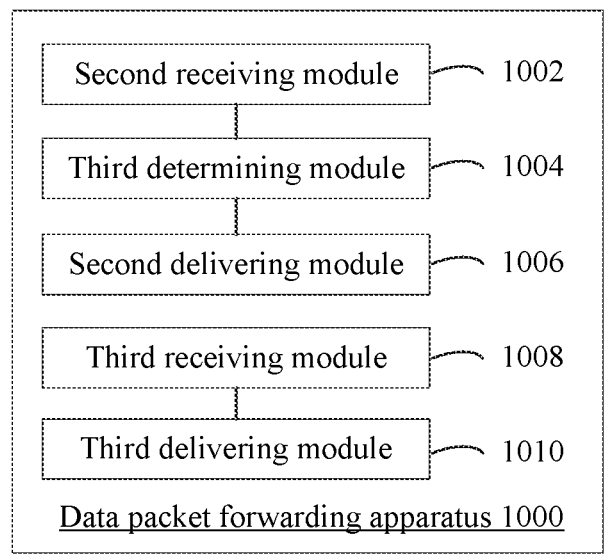
FIG. 10 is a schematic structural diagram of a data packet forwarding apparatus according to yet another embodiment of the present disclosure.

Referring to FIG. 10, FIG. 10 shows a schematic structural diagram of a data packet forwarding apparatus according to yet another embodiment of the present disclosure. As an embodiment, the data packet forwarding apparatus 1000 is applied in an OPENFLOW controller segment 160 in the implementation environment shown in FIG. 1. The data packet forwarding apparatus 1000 may include a second receiving module 1002, a third determining module 1004, and a second delivering module 1006.

The second receiving module 1002 may be configured to receive at least one aging flow entry reported by the virtual switch, where the at least one aging flow entry is a matched aging flow entry that is delivered by the virtual switch as a proxy to the OPENFLOW switch after the virtual switch determines, that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty.

The third determining module 1004 may be configured to determine whether the at least one aging flow entry received by the second receiving module 1002 is stored in the OPENFLOW switch.

The second delivering module 1006 may be configured to re-deliver the aging flow entry that is not stored to the OPENFLOW switch when at least one aging flow entry in the aging flow table is not stored in the OPENFLOW switch.

In a first possible implementation manner of this embodiment, the data packet forwarding apparatus 1000 may further include a third receiving module 1008 and a third delivering module 1010.

The third receiving module 1008 may be configured to receive a reporting data packet reported by the virtual switch, where the reporting data packet is a reporting data packet that matches none of aging flow entries in the aging flow table and is sent by the OPENFLOW switch and received by the virtual switch when the secure channel between the OPENFLOW switch and the OPENFLOW controller is faulty.

The third delivering module 1010 may be configured to deliver, to the OPENFLOW switch, a flow entry corresponding to the reporting data packet received by the third receiving module 1008.

In a second possible implementation manner of this embodiment, the third receiving module 1008 may be further configured to receive reporting data packets that are sequentially reported by the virtual switch according to an order of counts of the reporting data packets, where the counts of the reporting data packets are obtained by separately and increasing the counts of the reporting data packets by 1 when the virtual switch receives the reporting data packets that match none of the aging flow entries in the aging flow table and are sent by the OPENFLOW switch, and determines that the reporting data packets are stored in the virtual switch.

The third delivering module 1010 may be further configured to sequentially generate, according to an order in which the reporting data packets are received, flow entries corresponding to the reporting data packets, and deliver, to the OPENFLOW switch, the flow entries corresponding to the reporting data packets.

In conclusion, according to the data packet forwarding apparatus provided in this embodiment of the present disclosure, after a secure channel between an OPENFLOW switch and an OPENFLOW controller is restored, the OPENFLOW controller acquires an aging flow entry delivered by a virtual switch as a proxy, and determines correctness of the aging flow entry delivered by the virtual switch as a proxy, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect, an aging flow entry delivered by the virtual switch as a proxy after the secure channel is restored, the OPENFLOW controller re-delivers the aging flow entries when the virtual switch fails to deliver some aging flow entries to the OPENFLOW switch, thereby achieving an effect that the OPENFLOW switch can normally forward a subsequent forwarding data packet that is in a same flow immediately.

It should be noted that the data packet forwarding apparatus provided in the foregoing embodiments forwards a data packet is described merely using division of the foregoing function modules as an example. In an actual application, the foregoing functions may be allocated, as required, to different function modules for implementation. That is, internal structures of a virtual switch and an OPENFLOW controller are divided into different function modules to implement all or a part of the functions described above. In addition, the data packet forwarding apparatus and data packet forwarding method embodiments provided in the foregoing embodiments belong to a same conception. For a specific implementation process, refer to the method embodiments, and details are not described herein again.

Figure 11:
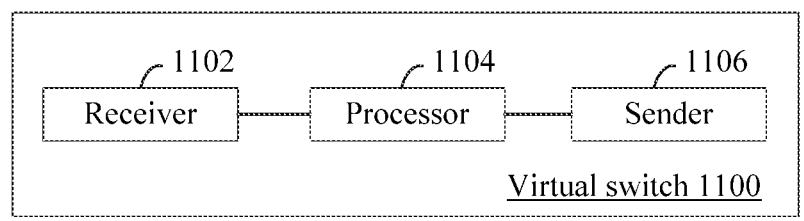
FIG. 11 is a schematic structural diagram of a virtual switch according to an embodiment of the present disclosure.

Referring to FIG. 11, FIG. 11 shows a schematic structural diagram of a virtual switch according to an embodiment of the present disclosure. As an embodiment, the virtual switch 1100 is applied in the implementation environment shown in FIG. 1. The virtual switch 1100 may include a receiver 1102, a processor 1104, and a sender 1106, where the processor 1104 is separately coupled with the receiver 1102 and the sender 1106.

The sender 1102 may be configured to store, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted, after the secure channel is faulty, by the OPENFLOW switch.

The processor 1104 may be configured to determine whether a reporting data packet that is sent by the OPENFLOW switch and received by the sender 1102 matches an aging flow entry in the aging flow table, where the reporting data packet is generated by the OPENFLOW switch according to a forwarding data packet when the forwarding data packet is received and after the forwarding data packet fails to match a stored forwarding flow entry.

The sender 1106 may be configured to deliver the matched aging flow entry to the OPENFLOW switch such that the OPENFLOW switch forwards the forwarding data packet according to the matched aging flow entry when the processor 1104 determines that the reporting data packet matches one aging flow entry in the aging flow table.

In conclusion, according to the virtual switch provided in this embodiment of the present disclosure, a virtual switch performs matching between a pre-stored aging flow entry and a received reporting data packet sent by an OPENFLOW switch when a secure channel between the OPENFLOW switch and an OPENFLOW controller is faulty, and delivers the matched aging flow entry to the OPENFLOW switch such that the OPENFLOW switch forwards a forwarding data packet according to the aging flow entry when the matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, the following effect is achieved. Forwarding of an existing service flow can still continue when a flow entry corresponding to the existing service flow ages when the secure channel between the OPENFLOW controller and the corresponding OPENFLOW switch is faulty.

Figure 12:
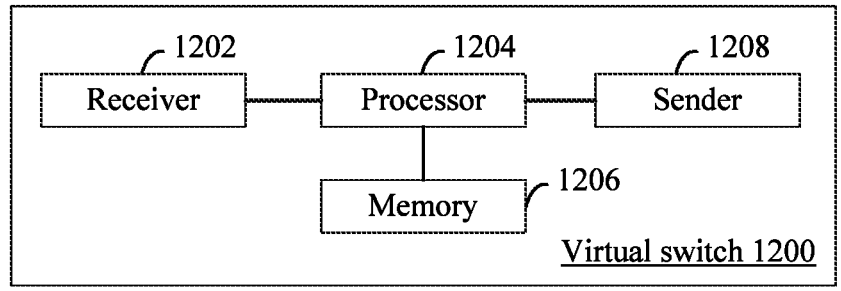
FIG. 12 is a schematic structural diagram of a virtual switch according to another embodiment of the present disclosure.

Referring to FIG. 12, FIG. 12 shows a schematic structural diagram of a virtual switch according to another embodiment of the present disclosure. As an embodiment, the virtual switch 1200 is applied in the implementation environment shown in FIG. 1. The virtual switch 1200 may include a receiver 1202, a processor 1204, a memory 1206, and a sender 1208. The processor 1204 is separately coupled with the receiver 1202, the memory 1206, and the sender 1208. At least one type of computer software is stored in the memory 1206. The processor 1204 can perform a related operation according to the computer software stored in the memory 1206.

The sender 1202 may be configured to store, in an aging flow table, a received aging flow entry that is deleted by the OPENFLOW switch and reported by the OPENFLOW switch when a secure channel between an OPENFLOW switch and an OPENFLOW controller is faulty, where the aging flow table is used to store an aging flow entry that is deleted, after the secure channel is faulty, by the OPENFLOW switch.

The processor 1204 may be configured to determine whether a reporting data packet that is sent by the OPENFLOW switch and received by the sender 1202 matches an aging flow entry in the aging flow table, where the reporting data packet is generated by the OPENFLOW switch according to a forwarding data packet when the forwarding data packet is received and after the forwarding data packet fails to match a stored forwarding flow entry.

The sender 1208 may be configured to deliver the matched aging flow entry to the OPENFLOW switch such that the OPENFLOW switch forwards the forwarding data packet according to the matched aging flow entry when the processor 1204 determines that the reporting data packet matches one aging flow entry in the aging flow table.

In a first possible implementation manner of this embodiment, the sender 1208 may be further configured to report, to the OPENFLOW controller, aging flow entries in the aging flow table that are already delivered to the OPENFLOW switch such that the OPENFLOW controller determines whether the aging flow entries, which are delivered by the virtual switch as a proxy to the OPENFLOW switch when the secure channel is faulty, are all received by the OPENFLOW switch when the secure channel between the OPENFLOW switch and the OPENFLOW controller is restored, and re-deliver, to the OPENFLOW switch, an aging flow entry that is not received by the OPENFLOW switch when the aging flow entries are not all received by the OPENFLOW switch.

In a second possible implementation manner of this embodiment, the processor 1204 may be further configured to determine whether the reporting data packet is stored in the virtual switch when the reporting data packet matches none of aging flow entries in the aging flow table.

The processor 1204 may be further configured to store the reporting data packet when the reporting data packet is not stored in the virtual switch.

In a third possible implementation manner of this embodiment, the sender 1208 may be further configured to report, to the OPENFLOW controller, reporting data packets that are stored in the virtual switch such that the OPENFLOW controller delivers, to the OPENFLOW switch, flow entries corresponding to the reporting data packets when the secure channel between the OPENFLOW switch and the OPENFLOW controller is restored.

In a fourth possible implementation manner of this embodiment, the processor 1204 may be further configured to increase a count of the reporting data packet by 1 when the reporting data packet is stored in the virtual switch, where the count represents a quantity of times the virtual switch receives the reporting data packet.

The sender 1208 may be further configured to sequentially report, to the OPENFLOW controller according to counts of the reporting data packets, the reporting data packets that are stored in the virtual switch such that the OPENFLOW controller sequentially delivers, to the OPENFLOW switch according to an order in which the reporting data packets reported by the virtual switch are received, flow entries corresponding to the reporting data packets.

In conclusion, according to the virtual switch provided in this embodiment of the present disclosure, when a secure channel between an OPENFLOW switch and an OPENFLOW controller is faulty, a virtual switch performs matching between a pre-stored aging flow entry and a received reporting data packet sent by the OPENFLOW switch, and delivers the matched aging flow entry to the OPENFLOW switch such that the OPENFLOW switch forwards a forwarding data packet according to the aging flow entry when matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch during a period when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, the following effect is achieved. Forwarding of an existing service flow can still continue when a flow entry corresponding to the existing service flow ages, and when the secure channel between the OPENFLOW controller and the corresponding OPENFLOW switch is faulty.

Figure 13:
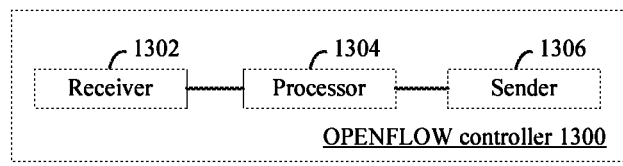
FIG. 13 is a schematic structural diagram of an OPENFLOW controller according to an embodiment of the present disclosure.

Referring to FIG. 13, FIG. 13 shows a schematic structural diagram of an OPENFLOW controller according to an embodiment of the present disclosure. As an embodiment, the OPENFLOW controller 1300 is applied in an OPENFLOW controller segment 160 in the implementation environment shown in FIG. 1. The OPENFLOW controller 1300 may include a receiver 1302, a processor 1304, and a sender 1306, where the processor 1304 is separately coupled with the receiver 1302 and the sender 1306.

The receiver 1302 may be configured to receive at least one aging flow entry reported by the virtual switch, where the at least one aging flow entry is a matched aging flow entry that is delivered by the virtual switch as a proxy to the OPENFLOW switch after the virtual switch determines, that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty.

The processor 1304 may be configured to determine whether the at least one aging flow entry received by the receiver 1302 is stored in the OPENFLOW switch.

The sender 1306 may be configured to re-deliver the aging flow entry that is not stored to the OPENFLOW switch when the processor 1304 determines that at least one aging flow entry in the aging flow table is not stored in the OPENFLOW switch.

In conclusion, according to the OPENFLOW controller provided in this embodiment of the present disclosure, after a secure channel between an OPENFLOW switch and an OPENFLOW controller is restored, the OPENFLOW controller acquires an aging flow entry delivered by a virtual switch as a proxy, and determines correctness of the aging flow entry delivered by the virtual switch as a proxy, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect, after the secure channel is restored, an aging flow entry delivered by the virtual switch as a proxy, the OPENFLOW controller re-delivers the aging flow entries when the virtual switch fails to deliver some aging flow entries to the OPENFLOW switch, thereby achieving an effect that the OPENFLOW switch can normally forward a subsequent forwarding data packet that is in a same flow immediately.

Figure 14:
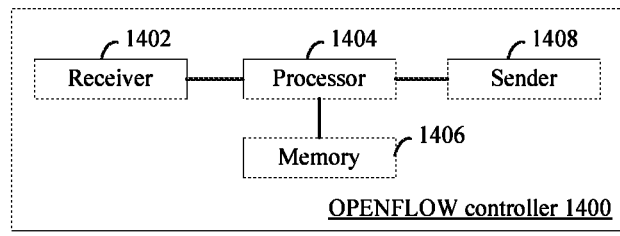
FIG. 14 is a schematic structural diagram of an OPENFLOW controller according to another embodiment of the present disclosure.

Referring to FIG. 14, FIG. 14 shows a schematic structural diagram of an OPENFLOW controller according to another embodiment of the present disclosure. The OPENFLOW controller 1400 is mainly described using an example in which the OPENFLOW controller 1400 is applied in an OPENFLOW controller segment 160 in the implementation environment shown in FIG. 1. The OPENFLOW controller 1400 may include a receiver 1402, a processor 1404, a memory 1406, and a sender 1408. The processor 1404 is separately coupled with the receiver 1402, the memory 1406, and the sender 1408. At least one type of computer software is stored in the memory 1406. The processor 1404 can perform a related operation using the computer software stored in the memory 1406.

The receiver 1402 may be configured to receive at least one aging flow entry reported by the virtual switch, where the at least one aging flow entry is a matched aging flow entry that is delivered by the virtual switch as a proxy to the OPENFLOW switch after the virtual switch determines, that a received reporting data packet sent by the OPENFLOW switch matches the aging flow entry in an aging flow table when a secure channel between the OPENFLOW switch and the OPENFLOW controller is faulty, where the aging flow table is used to store an aging flow entry that is deleted by the OPENFLOW switch, reported by the OPENFLOW switch, and received by the virtual switch after the secure channel is faulty.

The processor 1404 may be configured to determine whether the at least one aging flow entry received by the receiver 1402 is stored in the OPENFLOW switch.

The sender 1408 may be configured to re-deliver the aging flow entry that is not stored to the OPENFLOW switch when the processor 1404 determines that at least one aging flow entry in the aging flow table is not stored in the OPENFLOW switch.

In a first possible implementation manner of this embodiment, the receiver 1402 may be further configured to receive a reporting data packet reported by the virtual switch, where the reporting data packet is a reporting data packet that matches none of aging flow entries in the aging flow table and is sent by the OPENFLOW switch and received by the virtual switch when the secure channel between the OPENFLOW switch and the OPENFLOW controller is faulty.

The sender 1408 may be further configured to deliver, to the OPENFLOW switch, a flow entry corresponding to the reporting data packet received by the receiver 1402.

In a second possible implementation manner of this embodiment, the receiver 1402 may be further configured to receive reporting data packets that are sequentially reported by the virtual switch according to an order of counts of the reporting data packets, where the counts of the reporting data packets are obtained by separately and increasing the counts of the reporting data packets by 1 when the virtual switch receives the reporting data packets that match none of the aging flow entries in the aging flow table and are sent by the OPENFLOW switch, and determines that the reporting data packets are stored in the virtual switch.

The sender 1408 may be further configured to sequentially generate, according to an order in which the reporting data packets are received, flow entries corresponding to the reporting data packets, and deliver, to the OPENFLOW switch, the flow entries corresponding to the reporting data packets.

In conclusion, according to the OPENFLOW controller provided in this embodiment of the present disclosure, after a secure channel between an OPENFLOW switch and an OPENFLOW controller is restored, the OPENFLOW controller acquires an aging flow entry delivered by a virtual switch as a proxy, and determines correctness of the aging flow entry delivered by the virtual switch as a proxy, and re-delivers an aging flow entry to the OPENFLOW switch when the aging flow entry is incorrect. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because the OPENFLOW controller can detect, after the secure channel is restored, an aging flow entry delivered by the virtual switch as a proxy, the OPENFLOW controller re-delivers the aging flow entries when the virtual switch fails to deliver some aging flow entries to the OPENFLOW switch, thereby achieving an effect that the OPENFLOW switch can normally forward a subsequent forwarding data packet that is in a same flow immediately.

Figure 15:
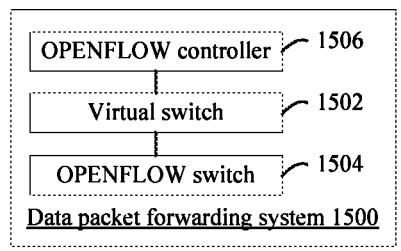
FIG. 15 is a schematic diagram of a data packet forwarding system according to an embodiment of the present disclosure.

Referring to FIG. 15, FIG. 15 shows a schematic diagram of a data packet forwarding system according to an embodiment of the present disclosure. The data packet forwarding system 1500 is mainly described using an example in which the data packet forwarding system 1500 is applied in the implementation environment shown in FIG. 1. The data packet forwarding system 1500 may include a virtual switch 1502, an OPENFLOW switch 1504 and an OPENFLOW controller 1506.

The virtual switch 1502 includes the data packet forwarding apparatus described in FIG. 7 or FIG. 8, or is the virtual switch described in FIG. 11 or FIG. 12.

The OPENFLOW controller 1506 includes the data packet forwarding apparatus described in FIG. 9 or FIG. 10, or is the OPENFLOW controller described in FIG. 13 or FIG. 14.

The OPENFLOW switch 1504 is the OPENFLOW switch mentioned in FIG. 7 to FIG. 14.

In conclusion, according to the data packet forwarding system provided in this embodiment of the present disclosure, a virtual switch performs matching between a pre-stored aging flow entry and a received reporting data packet sent by an OPENFLOW switch when a secure channel between the OPENFLOW switch and an OPENFLOW controller is faulty, and the virtual switch delivers the matched aging flow entry to the OPENFLOW switch such that the OPENFLOW switch forwards a forwarding data packet according to the aging flow entry when the matching is successful. This resolves the following problem in the prior art that is when a secure channel between an OPENFLOW controller and a corresponding OPENFLOW switch is faulty, and when the OPENFLOW switch deletes some flow entries according to an aging mechanism, subsequently received forwarding data packets corresponding to these flow entries cannot be forwarded, and consequently, the OPENFLOW switch loses a data exchange function. Because an aging flow entry that is deleted in an aging process by the OPENFLOW switch during a period when the secure channel is faulty is stored in the virtual switch, the virtual switch can take the place of the OPENFLOW controller to deliver an aging flow entry corresponding to a forwarding data packet that is subsequently received by the OPENFLOW switch and is in a same flow as a forwarding data packet corresponding to the deleted aging flow entry such that the OPENFLOW switch forwards, according to the aging flow entry delivered by the virtual switch, the forwarding data packet that is in the same flow. In this way, the following effect is achieved. Forwarding of an existing service flow can still continue when a flow entry corresponding to the existing service flow ages when the secure channel between the OPENFLOW controller and the corresponding OPENFLOW switch is faulty.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data packet forwarding method, applied in a network that comprising a switch, a controller, and a virtual switch, wherein the method comprises:
   receiving, by the virtual switch, a first reporting data packet sent by the switch, wherein the first reporting data packet is generated by the switch based on a determination that a first forwarding data packet fails to match a flow entry in a flow table stored at the switch and based on a determination that a secure channel between the switch and the controller is faulty; and
   delivering, by the virtual switch, a first flow entry from an aging flow table stored at the virtual switch to the flow table stored at the switch in response to the first reporting data packet matching the first flow entry, wherein the aging flow table comprises one or more flow entries that are deleted as aging flow entries from the flow table.

2. The method according to claim 1, further comprising reporting, by the virtual switch, the first flow entry from the aging flow table to the controller when the secure channel between the switch and the controller is restored.

3. The method according to claim 1, further comprising:
   receiving, by the virtual switch, a second reporting data packet sent by the switch, wherein the second reporting data packet is generated by the switch based on a determination that a second forwarding data packet failing to match each flow entry in the flow table and based on the determination that the secure channel between the switch and the controller is faulty; and
   saving, by the virtual switch, the second reporting data packet in response to the virtual switch receiving the second reporting data packet for a first time which matches none of flow entries in the aging flow table.

4. The method according to claim 3, further comprising reporting, by the virtual switch, the second reporting data packet to the controller based on the determination that the secure channel between the switch and the controller is restored.

5. The method according to claim 4, further comprising:
   increasing, by the virtual switch, a count of the second reporting data packet by 1, wherein the count represents a quantity of times the virtual switch receives the second reporting data packet; and
   reporting, by the virtual switch, the second reporting data packet to the controller according to counting sort of the second reporting data packet.

6. A data packet forwarding method, applied in a network that comprises a switch, a controller, and a virtual switch, wherein the method comprises:
   sending, by the switch, a first flow entry in a flow table as an aging flow entry to the virtual switch;
   deleting, by the switch, the first flow entry from the flow table;
   generating, by the switch, a reporting data packet based on a determination that the forwarding data packet fails to match a flow entry in the flow table stored at the switch and based on a determination that a secure channel between the switch and the controller is faulty; and
   sending, by the switch, the reporting data packet to the virtual switch.

7. The method according to claim 6, wherein the method further comprises:
   receiving, by the switch, a forwarding data packet;
   receiving, by the switch, an aging flow entry in an aging flow table from the virtual switch, wherein the aging flow table comprises one or more flow entries that are deleted as aging flow entries from the flow table in the switch; and
   forwarding, by the switch, the forwarding data packet according to the aging flow entry.

8. A data packet forwarding apparatus, applied in a virtual switch in a network, wherein the network comprises a switch, a controller, and the virtual switch, and wherein the apparatus comprises:
   a processor; and
   a memory coupled to the processor,
   wherein the processor is executing codes in the memory to perform the following operations:
      receive a first reporting data packet sent by the switch, wherein the first reporting data packet is generated by the switch based on a determination that a first forwarding data packet fails to match a flow entry in a flow table stored at the switch and based on a determination that a secure channel between the switch and the controller is faulty; and deliver a first flow entry from an aging flow table stored at the virtual switch to the flow table stored at the switch in response to the first reporting data packet matching the first flow entry, wherein the aging flow table comprises one or more flow entries that are deleted as aging flow entries from the flow table.

9. The apparatus according to claim 8, wherein the processor is further executing the codes in the memory to perform the operation report, by the virtual switch, the first flow entry from the aging flow table to the controller when the secure channel between the switch and the controller is restored.

10. The apparatus according to claim 8, wherein the processor is further executing the codes in the memory to perform the following operations:

receive a second reporting data packet sent by the switch, wherein the second reporting data packet is generated by the switch based on a determination that a second forwarding data packet failing to match each flow entry in the flow table and based on the determination the secure channel between the switch and the controller is faulty; and save the second reporting data packet in response to the virtual switch receiving the second reporting data packet for a first time which matches none of flow entries in the aging flow table.

11. The apparatus according to claim 10, wherein the processor is further executing the codes in the memory to perform the operation of reporting the second reporting data packet to the controller based on the determination that the secure channel between the switch and the controller is restored.

12. The apparatus according to claim 11, wherein the processor is further executing the codes in the memory to perform the following operations:

increase, by the virtual switch, a count of the second reporting data packet by 1, wherein the count represents a quantity of times the virtual switch receives the second reporting data packet; and report, by the virtual switch, the second reporting data packet to the controller according to counting sort of the second reporting data packet.

13. A switch, applied in a network, wherein the network comprises the switch, a controller, and a virtual switch, and wherein the switch comprises:

a processor; and
a memory coupled to the processor,
wherein the processor is executing codes in the memory to perform the following operations:

send a first flow entry in a flow table as an aging flow entry to the virtual switch;
delete the first flow entry from the flow table;
generate a report in g data packet according to the forwarding data packet based on a determination that the forwarding data packet fails to match a flow entry in the flow table stored at the switch and based on a determination that a secure channel between the switch and the controller is faulty;
send the reporting data packet to the virtual switch.

14. The switch according to claim 13, wherein the processor is further executing the codes in the memory to perform the following operations:

receive a forwarding data packet;
receive an aging flow entry in an aging flow table from the virtual switch, wherein the aging flow table comprises one or more flow entries that are deleted as aging flow entries from the flow table in the switch; and
forward the forwarding data packet according to the aging flow entry.

15. A network system, comprising:
a virtual switch;
a switch in communication with the virtual switch; and
a controller in communication with the virtual switch,
wherein, the switch is configured to:
receive a first forwarding data packet;
generate a first reporting data packet based on a determination that the first forwarding data packet fails to match a flow entry in a flow table stored at the switch and based on a determination that a secure channel between the switch and the controller is faulty; and
send the first reporting data packet to the virtual switch,
wherein the virtual switch is configured to:
receive the first reporting data packet; and
deliver a first flow entry from an aging flow table to the switch based on a determination the first reporting data packet matches the first flow entry, wherein the aging flow table comprises one or more flow entries that are deleted as aging flow entries from the flow table.

16. The network system according to claim 15, wherein the switch is further configured to report the first flow entry from the aging flow table to the controller based on a determination that the secure channel between the switch and the controller is restored, and wherein the controller is configured to receive the first flow entry.

17. The network system according to claim 15, wherein the switch is further configured to:
receive a second forwarding data packet;
generate a second reporting data packet based on a determination that a second forwarding data packet fails to match a flow entry in the flow table and based on the determination that the secure channel between the switch and the controller is faulty; and
send the second reporting data packet to the virtual switch, and
wherein the virtual switch is further configured to:
receive the second reporting data packet sent by the switch; and
save the second reporting data packet in response to the virtual switch receiving the second reporting data packet for a first time which matches none of flow entries in the aging flow table.

18. The network system according to claim 17, wherein the virtual switch is further configured to report the second reporting data packet to the controller based on a determination that the secure channel between the switch and the controller is restored, and wherein the controller is further configured to receive the second reporting data packet.

19. The network system according to claim 18, wherein the virtual switch is further configured to:
increase a count of the second reporting data packet by 1; and
report the second reporting data packet to the controller according to counting sort of the second reporting data packet, wherein the count represents a quantity of times the virtual switch receives the second reporting data packet.

20. The network system according to claim 15, wherein the switch is further configured to:
send an aging flow entry in the flow table to the virtual switch; and
delete the aging flow entry from the flow table, and wherein the virtual switch is further configured to:
  receive the aging flow entry; and
  save the aging flow entry in the aging flow table.

\* \* \* \* \*

UNITED STATES PATENT AND TRADEMARK OFFICE
CERTIFICATE OF CORRECTION

PATENT NO. : 10,135,725 B2  
APPLICATION NO. : 15/240232  
DATED : November 20, 2018  
INVENTOR(S) : Kai Qi, Bailin Wen and Fengwei Zhang Page 1 of 1

It is certified that error appears in the above-identified patent and that said Letters Patent is hereby corrected as shown below:

On the Title Page

Item (30), Line 1: "201410055766" should read "201410055766.X"

In the Claims

Column 31, Line 55: "report in g" should read "reporting"

Signed and Sealed this
Twenty-second Day of January, 2019

Andrei Iancu
*Director of the United States Patent and Trademark Office*